United States Patent [19]

Laufhütte et al.

[11] 4,143,122
[45] Mar. 6, 1979

[54] METHOD OF PROCESSING THE RESIDUAL GASES FROM CLAUS PLANTS OR OTHER SULFUR-PRODUCING PLANTS

[75] Inventors: Dieter Laufhütte, Recklinghausen; Günter Gronert, Dortmund-Kirchlinde, both of Fed. Rep. of Germany

[73] Assignees: Firma Carl Still; Eschweiler Bergwerks-Vereins, both of Fed. Rep. of Germany

[21] Appl. No.: 829,656

[22] Filed: Sep. 1, 1977

[30] Foreign Application Priority Data

Sep. 3, 1976 [DE] Fed. Rep. of Germany ....... 2639651

[51] Int. Cl.$^2$ ............................................. C01B 17/16
[52] U.S. Cl. .................. 423/574 R; 423/237; 423/564; 423/569; 423/648 R
[58] Field of Search ............... 423/564, 569, 570, 574, 423/237, 648 R

[56] References Cited

U.S. PATENT DOCUMENTS

| 3,615,231 | 10/1971 | Cullon | 423/570 |
| 3,752,877 | 8/1973 | Beavon | 423/573 |
| 3,798,308 | 3/1974 | Tatterson | 423/574 X |
| 4,029,752 | 6/1977 | Cahn | 423/570 |

FOREIGN PATENT DOCUMENTS 643807 6/1962 Canada ......................... 423/567

*Primary Examiner*—G. O. Peters
*Attorney, Agent, or Firm*—McGlew and Tuttle

[57] ABSTRACT

The present invention relates to a method of processing residual gases containing sulfur, hydrogen sulfide, and sulfur oxides and supplied from Claus plants or other surfur-producing installations, wherein the Claus plant is operated along or in connection with an ammonia decomposition plant in which ammonia-containing heated gases are directed through a decomposition zone which is free or filled with heat-resistant filler bodies or with a catalyst material, and the ammonia is decomposed into nitrogen and hydrogen and, thereupon, the gases are cooled and washed. The residual gases containing sulfur, hydrogen sulfide, sulfur oxides and ammonia-containing heated gases are fed to an ammonia decomposition chamber where the ammonia is decomposed into nitrogen and hydrogen and the residual gases react to produce a product gas enriched in hydrogen sulfide, the hydrogen for the reaction being supplied by the decomposition of ammonia. The product gas is further treated and the hydrogen-containing gas suitable for undergrate firing is removed therefrom.

10 Claims, 3 Drawing Figures

METHOD OF PROCESSING THE RESIDUAL GASES FROM CLAUS PLANTS OR OTHER SULFUR-PRODUCING PLANTS

FIELD AND BACKGROUND OF THE INVENTION

This invention relates in general to the processing of residual gases coming from a sulfur-producing installation and, in particular to a new and useful method of using heated ammonia-enriched vapors in combination with residual gases containing sulfur, hydrogen sulfide and sulfur oxides in an ammonia decomposition chamber using a catalyst-containing, free, or heat-resistant filler-containing chamber to decompose the ammonia into hydrogen and nitrogen and to convert the sulfur and sulfur oxides of the residual gases into hydrogen sulfide by using the available hydrogen from the ammonia decomposition reaction and removing the hydrogen-containing gas suitable for undergrate firing from the gas produced in the aforementioned reaction at one location after the decomposition chamber in the process.

DESCRIPTION OF THE PRIOR ART

Plants in which sulfur is produced in accordance with the Claus process in the coke industry are frequently operated in combination with ammonia decomposition plants, and in such a combined process the process steps are as follows: Gas fumes which contain both the ammonia washed out of the crude coke-oven gas and hydrogen sulfide and hydrogen cyanide are heated, the ammonia and hydrogen cyanide are decomposed, the gases are cooled, the hydrogen sulfide is stripped off, the decomposition gas free from hydrogen sulfide and containing hydrogen is discharged as undergrate firing gas, the hydrogen sulfide is expelled from the washing agent and used for the sulfur production, and the residual gas is evacuated into the atmosphere.

A method is known for completely removing the entire free ammonia contained in coke-oven gases, scrubbed with water and enriched in the so-called deacidizer fumes of a hydrogen sulfide wet scrubber operated in an ammonia recycling process, by decomposition in nitrogen and water, in which the whole amount of deacidizer fumes is burned with air having a volume sufficient for converting the ammonia to nitrogen and water and the hydrogen sulfide to sulfur, the heat of combustion of the ammonia is recuperated in the form of high-pressure steam, and the combustion gases are processed, in a well-known manner, to sulfur (German Pat. No. 1,212,052). This is a process, however, in which not only the ammonia is decomposed into nitrogen and hydrogen, but also the hydrogen is burned and a useless decomposition gas is obtained.

Also known is a method for decomposing the ammonia contained in coke-oven or gaswork gases, in which the fumes obtained during the stripping of gas wash water or condensates are heated, without a preliminary deacidizing and by burning a fuel, and directed through a decomposition zone which is a free space or a space filled with heat-resistant filler bodies or with a nickel catalyst of any shape (German Pat. No. 1,223,818). The hydrogen sulfide containing decomposition gases obtained in this process may be processed to sulfur in accordance with the Claus method, for example. The entire process is then a combined method as defined above.

In the Claus method as well as in other processes producing sulfur from hydrogen sulfide, a maximum conversion to sulfur of 70% to 90% is obtained. In coke-oven plants, this wide fluctuation is caused by unavoidable irregularities in operation and also by the varying content of ammonia, hydrogen cyanide, and hydrocarbons, contaminating the gas to be converted. In the residual gases of a Claus plant, hydrogen sulfide and sulfur dioxide are present in amounts which far exceed the critical concentration admitted by regulations. It is therefore absolutely necessary to subject the residual gases to a subsequent purification and to provide special plants in which the residual sulfur dioxide is converted, with the expensive use of hydrogen, into hydrogen sulfide. The entire hydrogen sulfide is then scrubbed out with the use of particularly efficient, but expensive washing agents, and the washing agents are regenerated. The costs of such additional plants may rise to amounts which make the entire process uneconomical.

SUMMARY OF THE INVENTION

The present invention is directed to a novel and simple method of processing the residual gases from Claus plants or other installations producing sulfur from hydrogen sulfide and operated along or in connection with ammonia decomposition plants in which substantially no expenditures for additional processing plants are required.

To this end, and in accordance with the invention, the residual gases of the sulfur-producing plant are united in their entirety with the ammonia-containing gases or fumes to be heated, and are fed, along therewith, into the ammonia decomposition zone, and at only one location of the entirety of the sulfur-producing plant and the ammonia decomposition plant, a hydrogen-containing gas low in sulfur compounds and ammonia and suitable for undergrate firing is delivered from the hydrogen sulfide scrubber which follows the ammonia decomposition zone.

The residual gases of the sulfur producing plant are advantageously fed into the ammonia decomposition zone separately. With an appropriate design of the conduits ahead of the ammonia decomposition zone, however, they may also be fed in along with the ammonia containing gases or fumes, or also with the heating gas.

The inventive method, among other things, utilizes the experience that the catalysts used in the decomposition zone for splitting the ammonia, convert the sulfur oxides as well. These are formed in relatively small amounts during the heating of the gases or fumes in direct contact with a burning heating medium and are contained in the waste gases of the sulfur producing plant. The oxides plus elemental sulfur are thus harmlessly and smoothly converted into hydrogen sulfide. The hydrogen required for these reactions is furnished, directly and in a satisfactory amount, "in statu nascendi" on the catalyst, through the ammonia decomposition.

In accordance with the invention, an insensitive and constantly operating sulfur-producing plant can be adjusted and, because of the recycling of the waste gases into the ammonia decomposition zone and the reconversion of sulfur and the sulfur oxides to hydrogen sulfide taking place therein, the primary conversion rate of the Claus plant is no longer determinative for the output of sulfur in the plant. It is only necessary to equip the sulfur-producing plant for a higher gas flow rate corresponding to the greater gas volume which is augmented by the residual gas amount from the Claus plant.

It is sufficient, and has proved advantageous, to provide a conversion to elemental sulfur of more than 60% of the sulfur compounds, considering a single passage of the gas.

In accordance with the invention, the total output of sulfur is increased and, for example, 99% of the hydrogen sulfide may be recovered in the form of sulfur in an economical manner, since substantially no losses through waste gas occur.

Accordingly, an object of the invention is to provide a method for processing the residual gases containing sulfur, hydrogen sulfide and sulfur oxides coming from a sulfur-producing installation which comprises, heating the residual gases and a mixture of gases containing ammonia to the decomposition temperature of ammonia to produce a hot gas mixture, passing the hot gas mixture into association with an agent so as to decompose the ammonia to form nitrogen and active hydrogen, and so as to convert the sulfur and sulfur dioxides into hydrogen sulfide to form a hydrogen sulfide-containing mixture wherein the active hydrogen produced by decomposing the ammonia aids in forming the hydrogen sulfide, cooling the hydrogen sulfide-containing mixture, spraying the cooled hydrogen sulfide-containing mixture with an aqueous solution which removes hydrogen sulfide from the hydrogen sulfide containing mixture to produce a hydrogen sulfide containing liquor and to release a hydrogen-containing gas suitable for undergrate firing which is low in sulfur, sulfur compounds and ammonia.

Another object of the invention is to provide an apparatus for processing the residual gases containing sulfur, hydrogen sulfide and sulfur oxides coming from a sulfur-producing installation which comprises, a burner, a first line connected to the burner for supplying an ammonia-containing gas to the burner and including a second line connected to the burner for supplying the residual gas to the burner, the residual gas and the ammonia-containing gas being heated to the decomposition temperature of ammonia in the burner, a decomposition chamber is further connected to the burner for decomposing the ammonia in the ammonia gas into nitrogen and active hydrogen and for converting the sulfur and sulfur oxides in the residual gas into hydrogen sulfide, whereby, the active hydrogen from the decomposition of the ammonia is utilized to form the hyrogen sulfide, a cooling means is connected to the decomposition chamber for cooling a gas coming from the decomposition chamber and containing hydrogen sulfide, a scrubber is further connected to the cooling means for removing hydrogen sulfide from the cooled gas and to release a hydrogen-containing gas usable in undergrate firing, a regenerator connected to the scrubber for producing a hydrogen sulfide-containing vapor from the hydrogen sulfide removed in the mentioned scrubber and the sulfur-producing installation is connected to the regenerator for extracting sulfur from the hydrogen sulfide-containing vapor and producing the aforementioned residual gases.

A further object of the invention is to provide an apparatus for processing the residual gases containing sulfur, hydrogen sulfide and sulfur oxides coming from a sulfur-producing installation which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
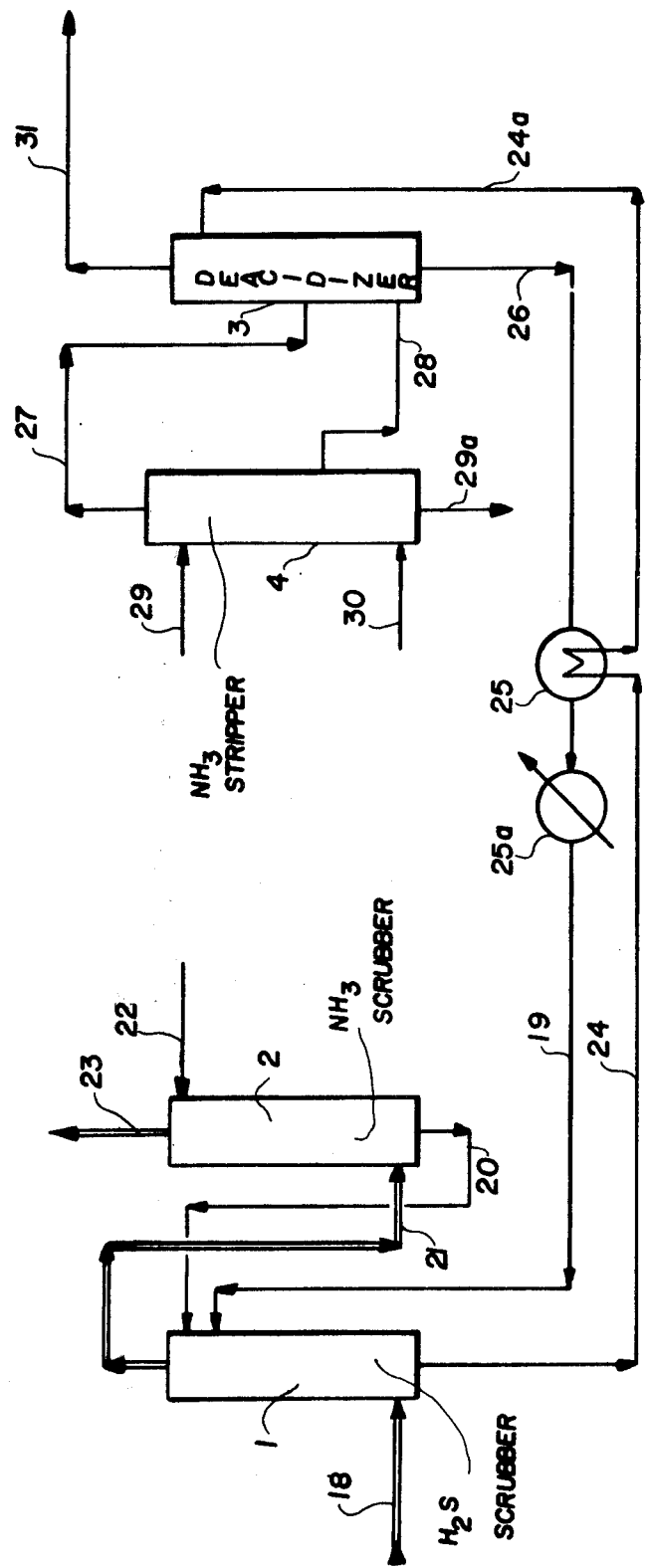
FIG. 1 is a schematic block diagram representing the process for producing an ammonia enriched steam or vapor in accordance with the invention.

Referring now to the drawings, crude coke-oven gas is supplied to an $H_2S$ scrubber 1 in FIG. 1, through a line 18. $H_2S$ scrubber 1 is further supplied, through a line 19, with circulated ammonia water and, through a line 20, with ammoniacal wash water from an $NH_3$ scrubber 2. Coke-oven gas stripped of $H_2S$ leaves $H_2S$ scrubber 1 through a line 21 and and enters $NH_3$ scrubber 2 into which softened fresh water is fed through a line 22. The purified coke-oven gas is discharged from the plant through a line 23. Ammonia water enriched in $H_2S$, $NH_3$, $CO_2$, and HCN is removed from scrubber 1 through a line 24, preheated in a heat exchanger 25 and directed through a line 24a into a deacidizer 3.

In order to expel the $H_2S$, deacidizer 3 is supplied with ammonia-containing steam through lines 27 and 28 from an ammonia stripper 4 to which all of the ammonia-containing coal water of the coke-oven battery (i.e., the moisture driven off from the coal during the carbonization and the water formed by chemical reactions, for example, dehydration, during the carbonization) is supplied through a line 29 and into which steam is fed through a line 30. Coal water freed from ammonia is drained through a line 29a. The deacidized $NH_3$ water is directed from deacidizer 3 through a line 26, heat exchanger 25, a cooler 25a and line 19 back into the crude gas $H_2S$ scrubber 1.

Figure 2:
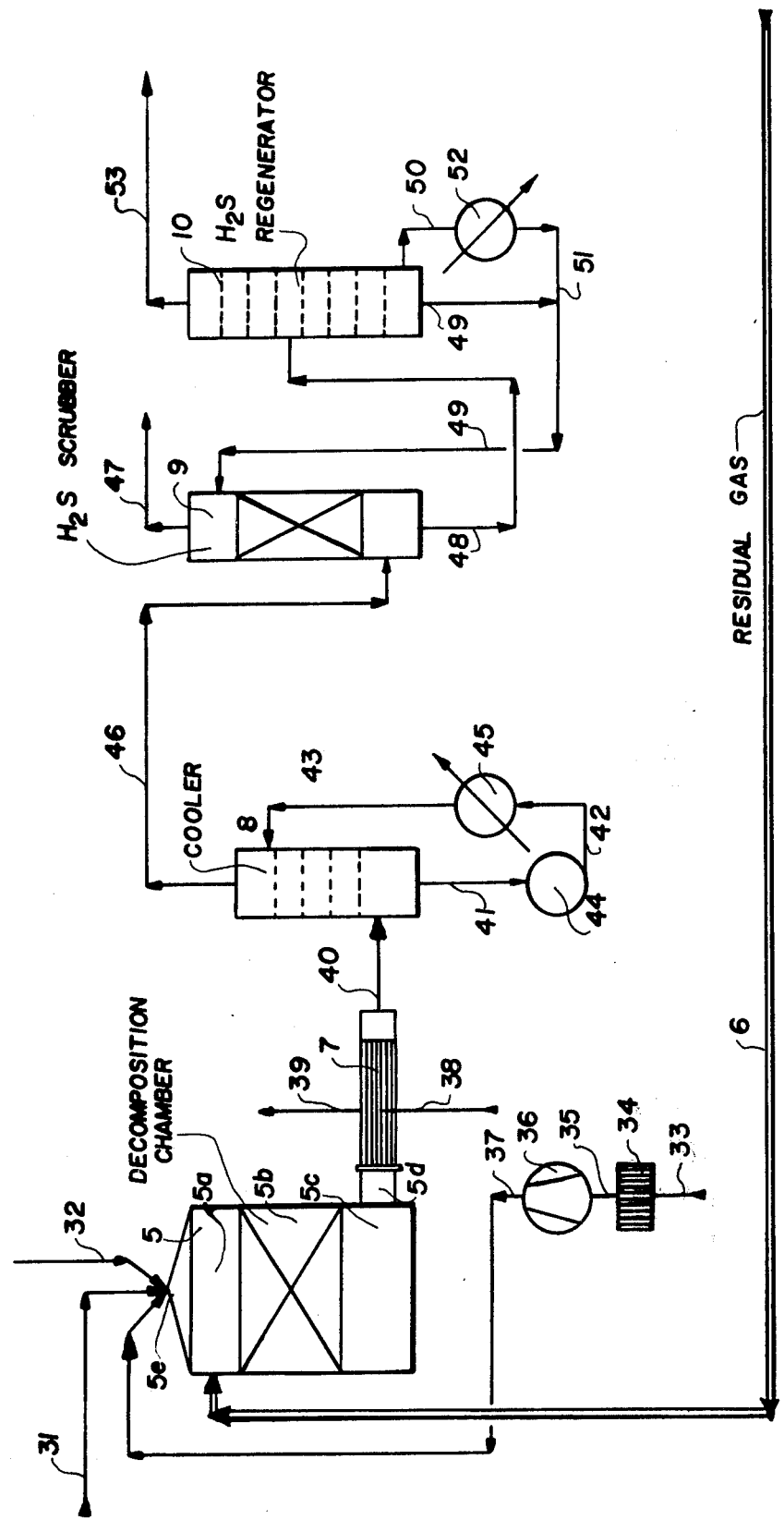
FIG. 2 is a schematic block diagram representing a process for combining and treating the residual gas from a sulfur-producing process with ammonia-enriched steam or vapor in accordance with the invention.

Steam fumes containing all of the $H_2S$, HCN, $NH_3$, and $CO_2$ washed out of the crude coke-oven gas leave deacidizer 3 through a line 31. As seen in FIG. 2, the fumes in line 31 are mixed in a burner 5e ahead of the combustion space 5a of a reactor 5, with coke-oven gas supplied through a line 32 and with combustion air fed in through lines 33, 35, and 37, filter 34 and compressor 36, and the coke-oven gas is burned.

Figure 3:
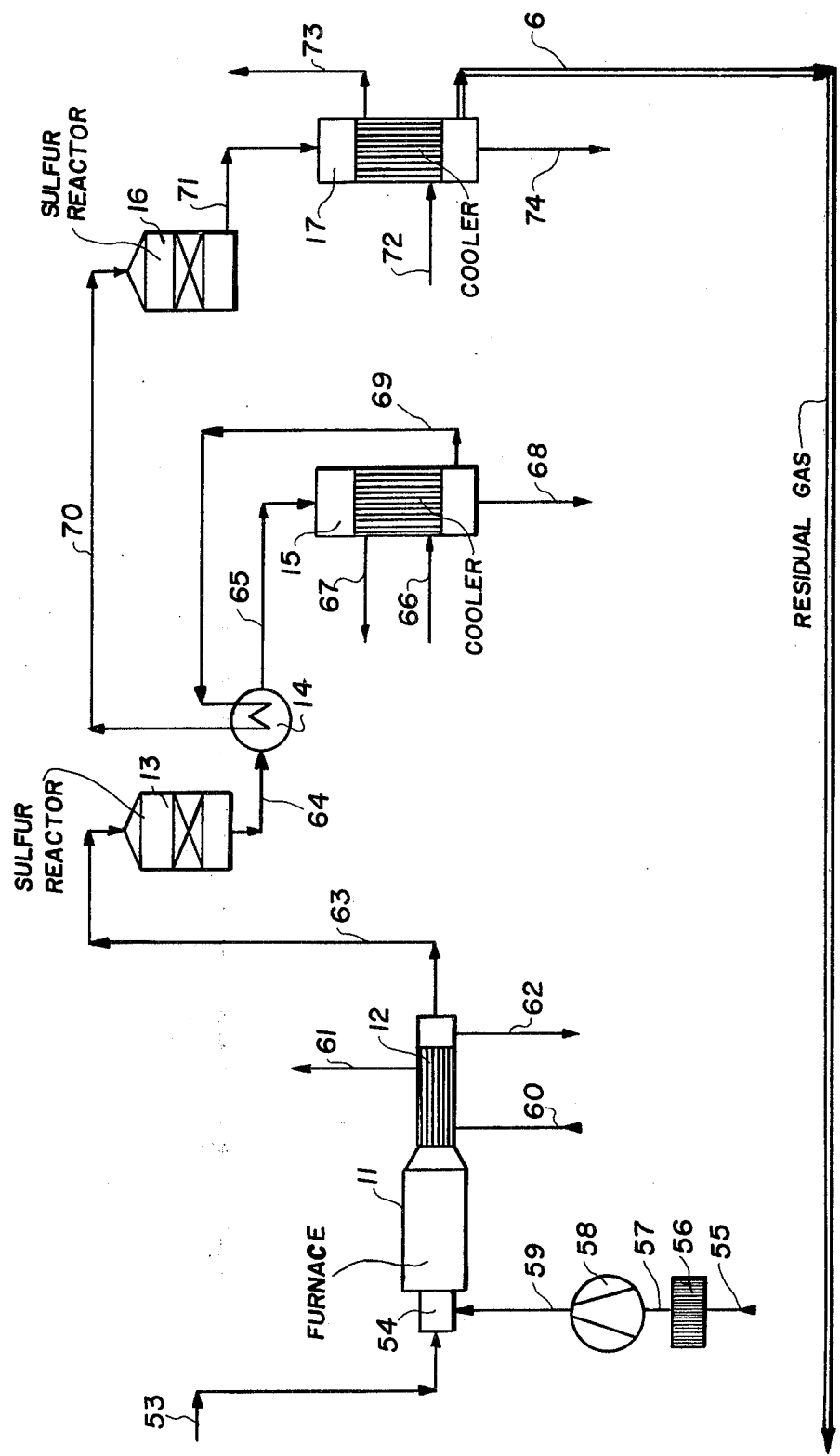
FIG. 3 is a schematic block diagram showing a process for removing sulfur from a hydrogen sulfide enriched gas.

The residual gases supplied through line 6 from the Claus plant (FIG. 3) containing $H_2S$, S, and $SO_2$ are admixed in the combustion space 5a, and the gas mixture is heated up to the $NH_3$ decomposition temperature, i.e., approximately to 1000° C. During this operation, small amounts of $SO_2$ and S are formed from the $H_2S$ fumes. The hot gas mixture passes into the decomposition zone 5b where it comes in contact with an agent, such as, a nickel catalyst (metal nickel on rings of magnesite). The zone may be a free space or have a heat-resistant filler therein. Here, the $NH_3$ is decomposed and the active hydrogen "in statu nascendi" converts the elemental sulfur and the sulfur oxides into $H_2S$. Now the sole sulfur compound present in the gas mixture is $H_2S$ and the mixture passes into collecting chamber 5c and from there, through outlet 5d into a waste-heat boiler 7 which is supplied with soft water through line 38 and wherefrom steam is removed through line 39. The gas mixture cooled down to about 300° C. is directed through a line 40 into cooler 8 which is connected in a water cooling circuit comprising lines 41, 42, and 43, a pump 44, and an indirect cooler 45, and in which the mixture is further cooled to about 30° C.

The gas mixture passes through a line 46 into a decomposition gas $H_2S$ scrubber 9 in which the hydrogen sulfide is washed out by means of an aqueous solution of the sodium compound of the alpha-amino-propionic acid (alanine) commercially available and known as "alkazid". Hydrogen-containing residual gas suitable for undergrate firing leaves the decomposition gas $H_2S$ scrubber 9 and the plant through a line 47. While burning this gas, no noxious substances are emitted, since $NH_3$ is present only in traces, and the $H_2S$ content is smaller than 0.3 g per $Nm^3$. The $H_2S$ containing wash liquor is directed, through a line 48, into a regenerating column 10 where it is freed from its $H_2S$ content and concentrated. For this purpose, apparatus 10 comprises a heating circuit including a return line 49 for returning the regenerated washing agent into $H_2S$ scrubber 9, and lines 50, 51, as well as a heater 52. The vapors containing $H_2S$ are discharged through a line 53 and directed to a burner 54 of the Claus furnace 11, seen in FIG. 3.

Burner 54 receives combustion air through lines 55, 57, and 59, as well as through a filter 56 and a compressor 58. The amount of combustion air is dimensioned so as to burn about one third of the $H_2S$ to $SO_2$. The combustion gases are directed from furnace 11 through a waste-heat boiler 12 which is supplied with soft water through aline 60 and wherefrom steam is removed through a line 61. The gas now has a temperature of 250° C. and the resulting condensed sulfur is removed in a liquid state through a line 62. The $H_2S$ and $SO_2$-containing gases pass through a line 63 into a reactor 13 which is filled with pieces of bauxite and in which the $H_2S$ and $SO_2$ are further converted to elemental sulfur. The gas loaded with sulfur vapor flows out through a line 64 and gives off a part of its heat content in heat exchanger 14, for the conversion in the next stage.

The gas passes through a line 65 into a cooler 15 which is supplied with soft water through a line 66 and from where, the steam is removed through a line 67. The sulfur condensed in cooler 15 is removed in a liquid state through a line 68. The gases further pass through line 69 into heat exchanger 14 where they are again heated up to 220° C. and flow through a line 70 into a complementary reactor 16 where, as in reactor 13, layers of bauxite pieces are provided and more sulfur is formed. Gases containing sulfur vapor and residual $H_2S$ and $SO_2$ are directed through a line 71 into a cooler 17 which is supplied with soft water through a line 72 and wherefrom steam is removed through a line 73. Condensed sulfur is removed in a liquid state from cooler 17 through a line 74, while the residual gases still containing some sulfur, sulfur oxide and hydrogen sulfide are directed through a line 6 back into the combustion space 5a of reactor 5.

While a specific embodiment of the invention has been shown and described in detail to illustrate the application of the principles of the invention, it will be understood that the invention may be embodied otherwise without departing from such principles.

What is claimed is:

1. A method for processing the residual waste gases containing sulfur, hydrogen sulfide and sulfur oxides coming from a sulfur-producing installation comprising, heating the residual gases and a mixture of gases containing ammonia to the decomposition temperature of ammonia to produce a hot gas mixture, passing the hot gas mixture into association with an agent so as to decompose the ammonia to form nitrogen and active hydrogen, and so as to convert the sulfur and sulfur oxides into hydrogen sulfide to form a hydrogen sulfide-containing mixture wherein a portion of the active hydrogen produced by decomposing the ammonia aids in forming the hydrogen sulfide, cooling the hydrogen sulfide-containing mixture, spraying the cooled hydrogen sulfide-containing mixture with an aqueous solution which removes hydrogen sulfide from the hydrogen sulfide containing mixture to produce a hydrogen sulfide containing liquor and to release a hydrogen-containing gas formed from the remaining active hydrogen suitable for undergrate firing which is low in sulfur, sulfur compounds and ammonia, the mixture of gases containing ammonia being a product of a coke-oven gas processing plant.

2. A method according to claim 1, wherein more than 60% of sulfur compounds are converted into elemental sulfur in the sulfur producing plant with a single passage of the gas.

3. A method according to claim 1, wherein the residual gases of the sulfur producing plant are fed into the ammonia decomposition zone separately.

4. A method according to claim 1, wherein said agent is a nickel catalyst.

5. A method according to claim 1, wherein said agent is a heat-resistant filler.

6. A method according to claim 1, wherein said agent is a free decomposition zone.

7. A method according to claim 1, wherein the residual gases and the mixture of gases containing ammonia are passed in association with the agent separately.

8. A method according to claim 1, wherein said aqueous solution for removing hydrogen sulfide comprises an alanine solution.

9. A method for removing sulfur oxide from the residual waste gases from a sulfur-producing Claus plant, the residual gases also containing sulfur and hydrogen sulfide, the Claus plant being operated in conjunction with an ammonia decomposition plant which is supplied with coke oven gases from a coke oven and the process of yielding a hydrogen-containing residual gas useable for undergrate firing, the process comprising, providing crude coke oven gas to a hydrogen sulfide scrubber to produce a gas stripped of hydrogen sulfide and an ammonia water product including hydrogen sulfide ammonia carbon dioxide and hydrogen cyanide feeding the ammonia product to a deacidizer for producing ammonia water and ammonia containing steam, the ammonia-containing steam including hydrogen cyanide, hydrogen sulfide, ammonia and carbon dioxide, feeding coal water containing ammonia from a coke oven to an ammonia stripper, feeding steam to said ammonia stripper for producing an ammonia steam mixture and a coal water substantially ammonia-free, feeding the ammonia steam mixture to said deacidizer for producing said ammonia-containing steam, feeding said ammonia-containing steam to a combustion space, feeding additional coke oven gas to said combustion space, feeding combustion air to said combustion space for burning said ammonia-containing steam and said coke oven gas, feeding said residual waste gas from the Claus plant to said combustion space for combining with said ammonia containing steam and coke oven gas to form a reaction mixture, passing said reaction mixture to a decomposition zone for decomposing the ammonia in said ammonia-containing steam to nitrogen and activated hydrogen in "statu nascendi" and converting said sulfur and sulfur oxides in the residual waste gas from said Claus plant into hydrogen sulfide using the activated hydrogen to form a gas mixture containing hydrogen sulfide as substantially the only sulfur-containing compound, said decomposition zone containing a catalyst, feeding said gas mixture containing hydrogen sulfide to a cooler for reducing the temperature thereof to about 30° C., feeding said cool gas mixture containing hydrogen sulfide to a hydrogen sulfide scrubber, supplying an aqueous solution to said last-mentioned hydrogen sulfide scrubber capable of washing out the hydrogen sulfide in said gas mixture containing hydrogen sulfide to form hydrogen sulfide containing waste liquor and a hydrogen-containing residual gas suitable for undergrate firing, said hydrogen-containing residual gas being formed from the remaining activated hydrogen in said gas mixture containing hydrogen sulfide, feeding said hydrogen sulfide containing waste liquor to a regenerator for producing a vapor containing hydrogen sulfide, supplying said vapor containing hydrogen sulfide to the burner of a Claus plant, providing combustion air to said burner of the Claus plant for reacting a portion of the hydrogen sulfide in said vapor to form a mixture containing elemental sulfur, sulfur oxides and the remainder of said hydrogen sulfide, and feeding said last-mentioned mixture to at least one reactor for removing additional elemental sulfur and forming said residual waste gas.

10. A method according to claim 9, further including feeding said gas strip of said hydrogen sulfide from said first-mentioned hydrogen scrubber to an ammonia scrubber for producing purified coke oven gas and ammoniacal waste water, feeding said ammoniacal waste water back to said first-mentioned hydrogen sulfide scrubber, feeding said ammonia water from said deacidizer to said first-mentioned hydrogen sulfide scrubber through a heat exchanger, said ammonia water product from said first-mentioned hydrogen sulfide scrubber flowing through said heat exchanger for picking up heat from said ammonia water passing therethrough, and said catalyst in said decomposition zone comprising at least one of a nickel catalyst and rings of magnesite.

* * * * *